Dec. 8, 1925.    R. CHILTON ET AL    1,564,826
FLOAT STRUCTURE
Filed March 16, 1925    3 Sheets-Sheet 1

INVENTORS
Roland Chilton
Frank A. Hayes
By
ATTORNEY

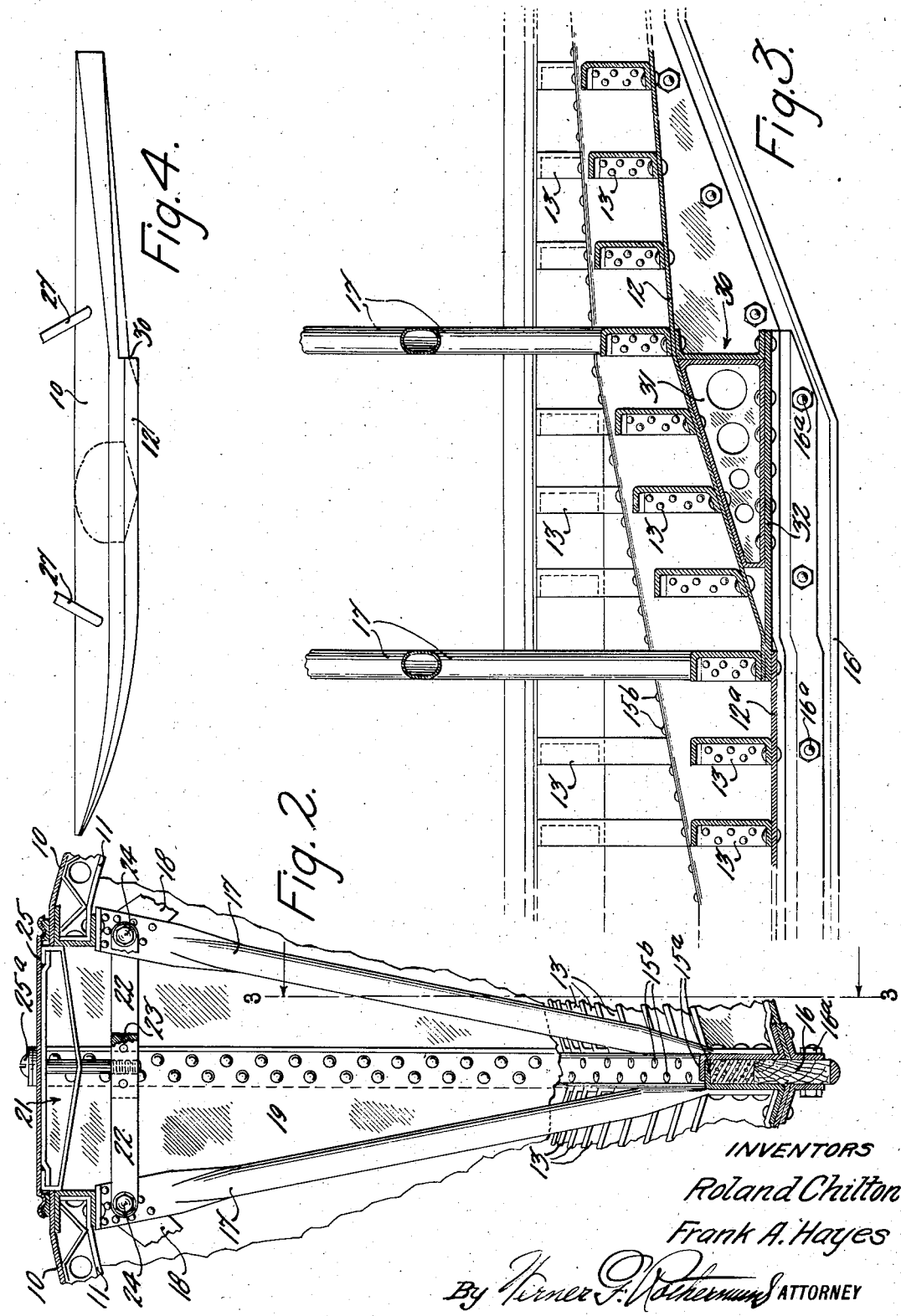

Dec. 8, 1925.  1,564,826
R. CHILTON ET AL
FLOAT STRUCTURE
Filed March 16, 1925   3 Sheets-Sheet 3

INVENTORS
Roland Chilton
Frank A. Hayes
By
ATTORNEY

Patented Dec. 8, 1925.

1,564,826

UNITED STATES PATENT OFFICE.

ROLAND CHILTON AND FRANK A. HAYES, OF KEYPORT, NEW JERSEY, ASSIGNORS TO AEROMARINE PLANE & MOTOR COMPANY, INC., A CORPORATION OF NEW YORK.

FLOAT STRUCTURE.

Application filed March 16, 1925. Serial No. 15,985.

*To all whom it may concern:*

Be it known that we, ROLAND CHILTON, a subject of the King of England, and FRANK A. HAYES, a citizen of the United States, and both residents of Keyport, in the county of Monmouth and State of New Jersey, have invented certain new and useful Improvements in Float Structures, of which the following is a specification, reference being had to the accompanying drawings, forming part of this specification.

This invention relates to hulls in general and especially to closed floats or pontoons as used on hydroplanes. The invention provides, in a specific aspect, improved structure and methods of fabrication for metal floats such as have been previously made by applying very light plates to a framework comprising a series of transverse frames and bulkheads defining the athwartships profiles and secured to keelsons and other longitudinal members.

Such light metal structures are characterized by the very great number of rivets required to obtain adequate strength and water-tightness. With conventional constructions, and especially in small watertight compartments, the rivets for the assembly of the last plates can only be reached through hand holes which make the setting of many rivets an awkward and laborious hand operation, and this is the chief cause of the excessive costs of this type of construction, especially where water-tight packing has to be fitted with each joint. The metal construction, however, is greatly to be desired on the grounds of strength, lightness and durability.

One of the prime objects of this invention, accordingly, is to provide a new type of construction wherein all rivets will be easy of access and whereby the great majority may be driven with the float in "open" condition.

To this end the fabrication of the float in two longitudinal halves has been suggested and essential features of this invention reside in the devising of a structural system which will render this two-part fabrication practicable and which will provide means whereby the halves may be united by relatively few, and these readily accessible, rivets. For instance, in the conventional construction a large number of athwartship floor beams are usually each secured by a multiplicity of rivets to opposite sides of the web of a central keelson to which transverse bulkheads must conform and be secured in a water-tight manner. Further, the bulkheads must be made water-tight to the skin around the entire periphery and the rivets involved could not be driven after the two halves, with the skin in place, had been brought together, since these pontoons are in general too small to permit of a mechanic getting inside.

Accordingly, this invention provides a hollow keelson made in two halves, one of which is completely riveted to the floor beam ends of each half before the halves are brought together and therefore while every rivet is completely accessible through the (then open) entire inboard profile of the float.

Upon final assembly a downwardly open space is left between the sides of this keelson whilst a horizontal flange extending along the top of one half laps a corresponding flange on the other. These flanges are directly under a central opening in the deck and are accordingly easily accessible for riveting by working respectively through that opening and from below.

This hollow keelson affords a ready means to receive a detachable keel or rubbing strip, preferably of wood, which may have relatively great depth to take shock loads, as when handling the ship on shore, and yet which does not project far enough to be liable to sideways failure.

Floats such as here described often support an aeroplane through struts at the amidships sections and are accordingly subject to great longitudinal bending moments. With the depth between top and bottom plates usual to these closed float profiles, it will be found that the thinnest practicable plates, considered as a tubular beam give the structure much greater strength against longitudinal bending than would any practicable keelson structure. The side walls of the float then act as shear members, distributing the vertical load as tension to the floor plates and compression to the deck.

With the extremely thin plating here contemplated secondary failure would occur in the deck compression members before the full compressive strength of the materal is realized, unless sideways distortion or local crumpling is prevented by suitable stiffening and bracing means. The usual thwartships curvature of the deck is of assistance in this direction, and this invention proposes an improved bracing means for the floor which also connects to the deck to prevent lateral distortions thereof.

The "skin" system of support outlined above involves the carrying of all loads and reaction into the side walls, as should be done in all thin flanged beams, since the thin flanges have by themselves very little resistance to lateral loads.

The function of the floor cross beams is to carry the supporting water pressure on the bottom plates to the side walls, to which the outboard ends of the cross beams are accordingly tied over a sufficient area to develop adequate strength in the plate. The length of these beams corresponds to the width of the float and under the uniform water loading the required strength increases as the square of this dimension. Heavy keelsons are often used as a beam between bulkheads to relieve the cross beams of some portion of the load on the center of their span. The load distribution in such constructions is only determinable after successful analysis of the relative stiffness of the floor and keelson beams.

In accordance with the bi-part structure of this invention, the floor beams are definitely designed as half width members and the entire keel-end loads are transferred to the side walls by a new brace structure constituting the basis of each athwartship frame and comprising central king-posts from the top of which diagonal ties connect to the side wall and outboard end of the cross beams. As stated above, these king posts tie into the deck while the tension member converts the curved deck plates and stiffeners into a bowstring arched structure thus giving great resistance against lateral distortion and secondary failure, without any added weight. It will be appreciated that this trussed structure reduces the effective span of the floor beams by one half and consequently the bending load on, and the weigth of, these parts to one-fourth. Hence the truss utilizing the entire depth of the float affords a lighter structure than the usual flange-and-web beams bridging the entire width of the float.

It will be seen that the strength of the structure as a whole depends upon the resistance to longitudinal extension of the deck and bottom plates. The continuity of the latter is usually interrupted by the amidships "step" by which the bottom profile is broken. Another feature of this invention resides in the construction which develops consistent strength along the whole of the bottom plates despite the "steps". According to this system the after (and upper) bottom plates are carried forward over the step and trend downwardly to an attachment with the forward bottom plates, which extend aft of this connection to form the step, whereat the whole structure is suitably reinforced as by a transverse beam having its upper flange secured to the after plate. The greatest impact to which the bottom plates are subject occur just forward of the step and in the construction of this invention the structure is of box form at this part and is accordingly especially strong.

The bottom of the floats for hydroplanes are subject to severe water impact loads in landing and taking off at high speeds in rough water while the side plates in general only receive the very much smaller hydrostatic pressure due to their depth of immersion. In usual constructions, built up around pre-formed thwartship profile frames, the floor beam and deck stiffener members have the same longitudinal spacing, which is not consistent with the large difference of loads on the two areas.

Upon analyzing the support of a plate, under a specified loading, by cross beams, it will be found that the total weight of beams (of a certain height) is independent of the number of beams used, i. e., independent of the beam spacing. Doubling the number of beams in a given length merely results in halving the load on, and therefore the necessary weight of, each. On the contrary, considering the plate, it will be found that the thickness required varies directly as the span between beams, so that an economy of weight is effected by using an unusually large number of closely spaced and relatively light floor beams whereby a relatively thin plate can be used. With the combined floor beam and deck frame usually employed, such close spacing of the floor beams would lead to an undue multiplicity of deck frames and this invention accordingly includes inter-costal floor cross beams adequately tied at their ends to the keelson and side walls respectively.

To further carry out the object of affording complete accessibility of all parts of the internal structure, longitudinal openings with removable cover plates are provided in the deck and dual kingposts are used in each truss, one for each half of the float, to permit fabrication of each float element as a rigid self-contained structure. These kingposts are inclined and permanently secured at their upper ends to one side of the deck opening which is then free of fixed obstructions. The central closing ties between the upper ends of the kingposts on each truss are formed as detachable tension links, one or more of which may be readily removed should they interfere with the desired accessibility. With the belt-frame system of deck stiffeners of the prior art, involving continuous frames extending across the deck openings, the accessibility is impaired, a condition which it is one of the objects of this invention to avoid.

In the usual belt-frame type of construction the frames (when secured to longitudinal members) form a profile frame work to the outside of which the skin plates are conformed, with the result that the rivets of the plates last applied are accessible only through the usually small, hand holes. These frames are often formed integral with the floor beams by flanging over metal sheets to form a ring of the desired profile which usually varies from frame to frame necessitating a large number of costly operations with relatively expensive forms or dies. In the present invention, on the contrary, the straight floor beams are fabricated separately from the deck frames or stiffeners which are constructed on the system disclosed in my co-pending application hereinafter to be mentioned whereby these members are made up in random lengths which are easily manually conformable to any desired curvature of plate and which form a rigid structure only after securing to the plate.

Accordingly, in the present system of float construction skeleten forms or matrices representing each half of the floor are made up, preferably of boards cut to the specified station profiles and the plates are fitted to these forms. The internal structure is then fitted and riveted to the plates and on securing the trussed kingposts and ties each open half becomes a rigid self-contained structure adapted to be secured to its companion half. Since all bracing is commonly confined to the inside of the float, which is usually too small to accommodate workers, the provisions of this invention which permit of open-sided fabrication rendering all connections accessible for rivet working will greatly reduce costs and liability to faulty workmanship or incomplete inspection. Further, by employing skeleton assembly forms located intermediate the frames mechanical riveting may be used on account of the open-sided construction.

The water-tight bulkheads lap vertically amidships, the joint terminating at the top of the cellular keel. Each half of the bulkhead is permanently secured to the associated keelson-side before the halves are brought together all the riveting being then readily accessible. The new hollow keelson construction avoids bulkhead joint rivets below the keelson top where they would be inaccessible on account of the adjacent floor beams.

Riveted connections have been used for convenience in terminology in the foregoing, but any practicable fastening means may be used without departing from the spirit of this invention. Also by way of illustration, two sections conveniently referred to as "halves" have been used, but the assembly of the larger floats from any convenient number of prefabricated sections is rendered practicable by the special new constructions of this invention which is not specifically limited to a two-part construction.

Various other objects and advantages of the invention will be in part obvious from an inspection of the accompanying drawings and a careful consideration of the following particular description and claims of one form of mechanism embodying our invention.

In the drawings:

Figure 2 is a fragmentary view showing the two halves in their assembled relation.

Figure 3 is a fragmentary longitudinal section taken on the line 3—3 of Fig. 2 and discloses the special construction of the amidship "step".

Figure 4 is a diagrammatic side elevation of a float or pontoon.

Figure 1:
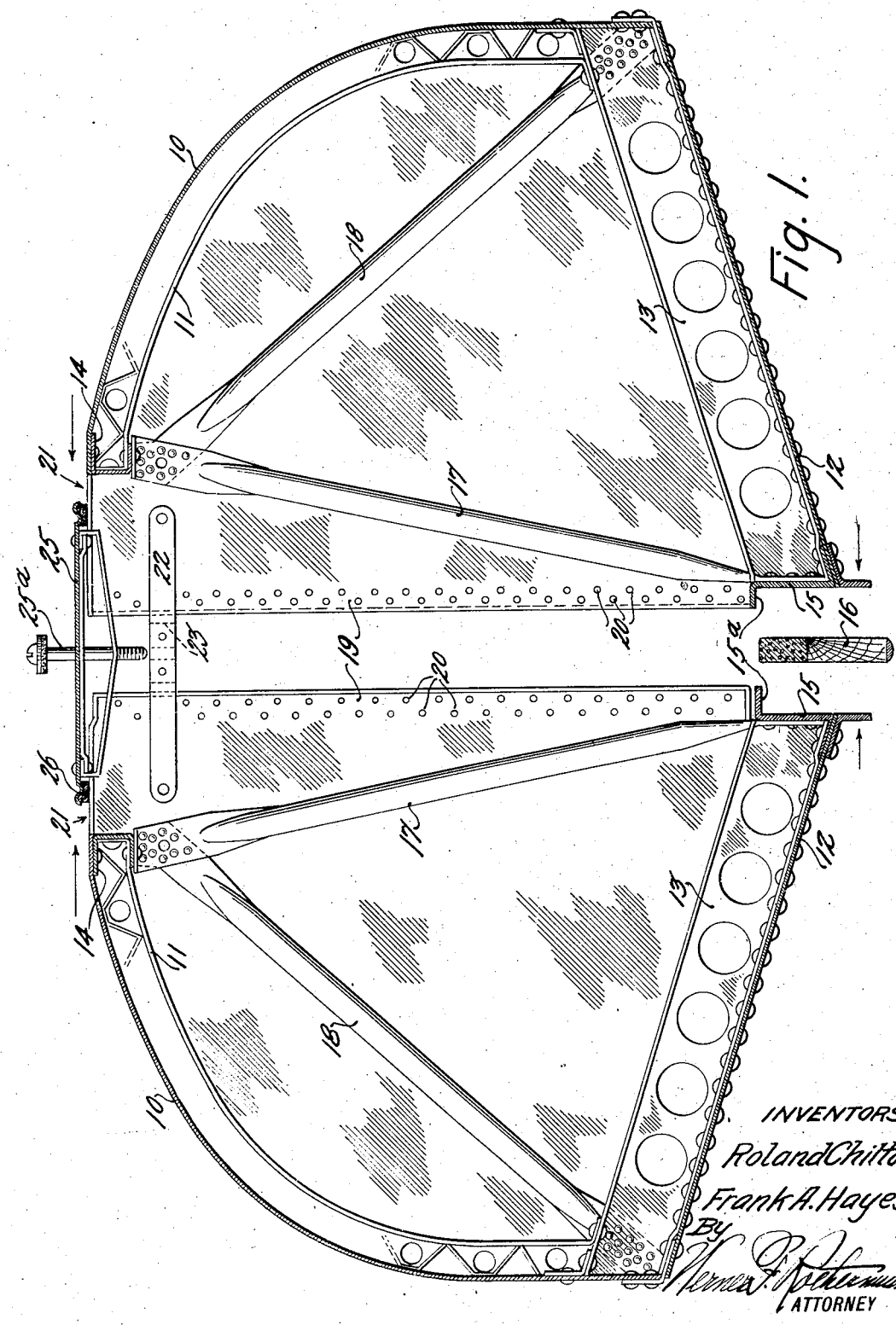
Figure 1 is a cross of athwartship sectional view of a float showing the two halves in near assembled relation, and in a position to be moved together as indicated by the arrows.

With reference to Figs. 1 and 2, there is shown the two half portions of a float, formed substantially alike in which 10 designates the curved outer shell or skin forming the sides and deck of the float and which is stiffened by a plurality of longitudinally spaced apart bracing members 11 preferably formed in the manner as disclosed in the copending application of Roland Chilton, Ser. No. 14,291, filed March 9, 1925. To the lower edge of the skin 10 there is secured in any suitable manner, the floor plates 12 which are stiffened by a plurality of longitudinally spaced apart beams 13 connecting with the bracing members 11 and having upper and lower flanges, the latter being secured to the floor plates by rivets as shown. A longitudinal beam 14 substantially U-shaped in cross section is secured to the upper edge of the skin 10 and is engaged by the ends of the bracing members 11.

To the inner ends of the floor beams 13 on each half of the float there is secured one side of the hollow keelson 15 provided with flanges 15$^a$ adapted to lap one another and to be secured together by the rivets 15$^b$. In this hollow keelson there is disposed the keel 16 secured in a removable manner by the bolts 16$^a$.

Kingposts 17 and cooperating tension members 18 are secured at the ends of certain of the floor beams. A tie member 22 completes each structure to form a thwartships truss frame by which keel loads are transferred back to the vertical walls of the float structure without imposing bending moments on the floor beams. The link 22 is made detachable to avoid possible interference with access to the interior of the hull through the openings 21.

Suitably spaced bulkeads 19 provide water-tight compartments within the float and are constructed so that the two halves of each bulkhead may form a lap joint directly over the keel 16. The rivet holes 20 of each half are adapted to register so as to permit the introduction of the rivets therethrough in the final assembly, access for which is readily had through the upper openings 21.

The tension links 22 are formed of two spaced apart members having a block 23 secured therebetween. These links are attached to either side of the upper portion of the kingposts 17 by the bolts 24.

Suitable cover plates 25 having gaskets of yieldable material 26 are provided to form a water-tight closure for the openings 21 when the two halves of the float have been brought together and fully secured. These cover plates 25 are fastened down by the screws 25ª which enter tapped holes in the blocks 23.

Figure 5:
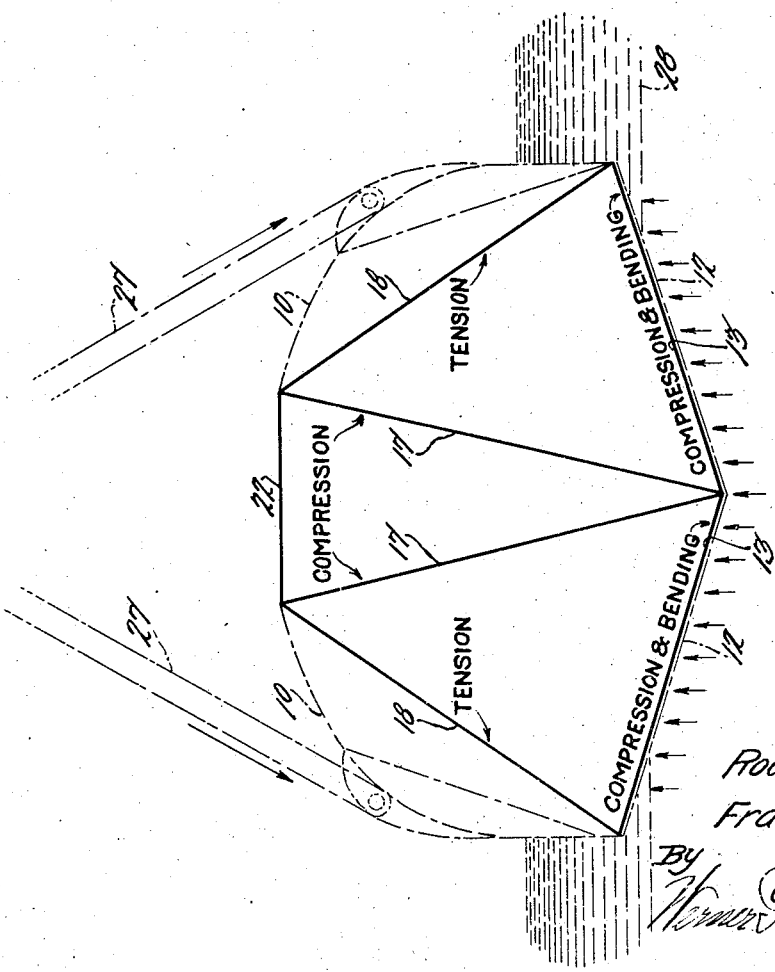
Figure 5 is a diagrammatic view of the parts shown in Fig. 1.

With reference to Fig. 5 there is indicated by the arrows the direction in which the forces are applied to the structure by the struts 27 and the water 28. This figure also indicates the nature of the stresses which the various truss member resist.

Figure 6:
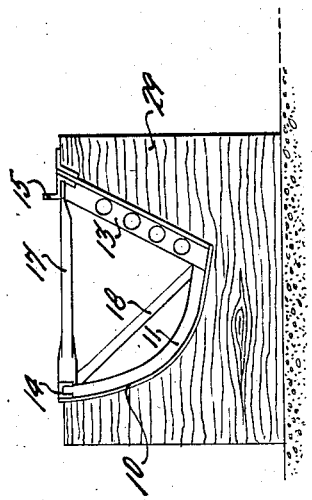
Figure 6 is an end elevation showing one of the forms which constitute a matrix with one half of the float supported therein.

Fig. 6 discloses the manner or method of forming the individual half portions of the float in which a number of relatively narrow forms or boards 29 are set up in spaced apart relation upon a floor or other base. These boards have been cut out as shown so as to form a templet or matrix for one half of the float and have been provided with the proper curvature for the bending of the plates.

The beams 13, braces 11, king posts 17, and in fact all of the parts that go to make up each half of a float are applied and riveted in the form, the spacing of the boards 29 being such as to provide exterior access to the plates to be riveted. Complete access to the interior is afforded by the open condition of the individual half portions of the float.

With reference to Fig. 3, 30 designates the amidships "step" hereinbefore referred to, in which the after bottom or floor plates 12 are carried forward over the step and trend downwardly to form a lap joint with the forward floor plates 12ª. A transverse beam 31 has an upper flange secured to after plate 12 and a lower flange secured to a relatively thick plate 32 interposed between the forward and after bottom plates at the lap joint.

While we have shown and described and have pointed out in the annexed claims certain novel features of our invention, it will be understood that various omissions, substitutions and changes in form and detail of the device illustrated and in its operation may be made by those skilled in the art without departing from the spirit of the invention.

Having thus described our invention, we claim:—

1. In a float, deck plates on either side of central longitudinal openings, a hollow keelson including two side members, floor plates and beams secured to respective keelson sides, means for securing the keelson sides together and means for covering the deck openings.

2. In a float, two longitudinally joinable halves each constituting a fabricated unit comprising skin plating and a keelson member secured thereto, means for uniting the halves by securing the keelson members together and means for covering an opening between the upper plates of the two halves.

3. In a float structure, a central keelson having two side members each fabricated into one side of the float structure, and means for uniting the keelson sides after such fabrication.

4. A hull structure comprising two longitudinal halves adapted for individual fabrication and each including a deck portion, a bottom portion and a keelson portion in combination with means for connecting the deck and keelson portions to form a closed hull.

5. A float comprising two pre-fabricated longitudinal portions each including skin plates, longitudinal keel halves and bulkhead halves, and means for connecting the skin plating, the keel halves and the bulkhead halves to form a closed structure having water-tight compartments.

6. In a float, the combination of, a hollow keelson closed at the top and open at the bottom and having two side members overlapping at the top, bottom plates secured to each side member, means for securing the side members together, and a keel piece inserted in the hollow keelson and projecting downwardly therefrom.

7. A keelson comprising, two longitudinal halves having substantially vertical portions spaced apart when in assembled relation, an upper flange on one half adapted on assembly to lap a corresponding flange on the other half, an outwardly turned flange on each half, in combination with bottom plates secured to each last said flange.

8. In a float having bottom plates, a hollow keelson comprising spaced apart sides, each fabricated into a side portion of the bottom plates and means for uniting the keelson sides to assemble the float sides after such fabrication.

9. A keelson for a two-part float comprising spaced apart sides of Z section united together by the upper flanges thereof and to the floor plates of respective parts of the float by the lower flanges.

10. In a float, a two-part hollow keelson united by horizontal flanges whereby the uniting means are accessible both from the inside and outside of the float.

11. In a two-part float, a keelson side member fabricated into each float part, bulkhead parts in each float joined to the associated keelson sides in combination with jointing means between the bulkhead and keelson parts adapted to secure the float parts together.

12. In a float having a keel, a trussed frame comprising a pair of floor beams each having one end secured to a side of the keel and the other end to the sides of the float, a kingpost secured at the keel end of each beam, tension members tying the kingposts to the outboard ends of the beams and a connection between the kingposts and the top of the float.

13. In a float having a keel and side and deck plating, a trussed frame comprising floor beams secured between the keel and the side plating, kingpost means secured at the keel ends of the beams, tie members connecting the kingpost means to the outboard end of the beams, said kingpost means connected to the deck.

14. In a pontoon having a central deck opening and a keel, a trussed frame comprising kingposts secured on either side of the keel and extending to either side of the deck opening, beams secured at the kingposts to each side of the keel and to the sides of the pontoon, tie means connecting the upper ends of the kingposts to the outboard ends of the beams.

15. In a pontoon having a central deck opening and a keel, a trussed frame comprising kingposts secured on either side of the keel and extending to either side of the deck opening, beams secured at the kingposts to each side of the keel and to the sides of the pontoon, tie means connecting the upper ends of the kingposts together and to the outboard ends of the beams, the tie means between the kingposts being readily detachable to clear the opening of obstructions.

16. The method of fabricating a float which consists in setting up skeleton forms appropriate to each half profile of the float, conforming skin plating to said forms, securing internal bracing to said plates with the halves in open condition, and then assembling the halves together to form a closed float.

17. The method of fabricating a pontoon which consists in setting up skeleton forms defining the shape of each half of the pontoon, conforming the plates to the said forms, fabricating keelson sides and suitable bracing into the skin plates with the halves in open condition, and then assemblying the halves together to form a closed pontoon.

18. In a float having after bottom plates disposed higher than the forward plates to form a step, an after plate continued forwardly over the step and tending downward to connect with the forward plate ahead of the step and means for holding the end of the forward plate in spaced apart relation to the after plate at the step.

19. In a pontoon having a step, a forward plate forming the bottom of said step, a cross beam forming the face of the step, an after plate secured to the top of the cross beam and continuing forwardly thereof and downwardly therefrom to an attachment with the bottom plate ahead of the step.

20. A step construction for a pontoon comprising a cross beam defining the depth of the step, a bottom plate extending forwardly of the cross beam and attached to the bottom thereof, an after plate secured intermediate its ends to the top of the cross beam and extending forwardly thereof to a point of attachment with the bottom plate.

21. A step structure for a hydroplane hull comprising a triangular sectioned box disposed athwartships and having a substantially horizontal face defined by the bottom plates, a substantially vertical side defining the face of the step and a sloping top formed by the after plates of the hull extending forwardly of the step to an engagement with the bottom plate.

Signed at Keyport in the county of Monmouth and State of New Jersey this 13th day of March, A. D. 1925.

ROLAND CHILTON.
FRANK A. HAYES.